(12) United States Patent
Zhang et al.

(10) Patent No.: US 11,494,272 B2
(45) Date of Patent: Nov. 8, 2022

(54) METHOD, DEVICE, AND COMPUTER PROGRAM PRODUCT FOR DATA PROTECTION

(71) Applicant: EMC IP Holding Company LLC, Hopkinton, MA (US)

(72) Inventors: Simon Zhang, Chengdu (CN); Leon Qianyun Cheng, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 222 days.

(21) Appl. No.: 16/866,145

(22) Filed: May 4, 2020

(65) Prior Publication Data

US 2021/0263804 A1    Aug. 26, 2021

(30) Foreign Application Priority Data

Feb. 25, 2020   (CN) .......................... 202010117350.1

(51) Int. Cl.
| | | |
|---|---|---|
| *G06F 7/00* | (2006.01) | |
| *G06F 11/14* | (2006.01) | |
| *G06F 16/28* | (2019.01) | |
| *G06F 16/22* | (2019.01) | |
| *G06N 20/00* | (2019.01) | |
| *G06N 5/04* | (2006.01) | |
| *G06N 5/00* | (2006.01) | |

(52) U.S. Cl.
CPC ...... *G06F 11/1458* (2013.01); *G06F 16/2246* (2019.01); *G06F 16/285* (2019.01); *G06N 5/003* (2013.01); *G06N 5/04* (2013.01); *G06N 20/00* (2019.01); *G06F 2201/80* (2013.01)

(58) Field of Classification Search
CPC .............. G06F 11/1458; G06F 16/285; G06F 16/2246; G06F 2201/80; G06N 20/00; G06N 5/003; G06N 5/04
USPC .................................................. 707/600–899
See application file for complete search history.

(56) References Cited

U.S. PATENT DOCUMENTS

2005/0028006 A1* 2/2005 Leser ...................... H04L 63/20
                                                              726/26
2018/0075251 A1* 3/2018 Van Hoof ........... G06F 21/6227

* cited by examiner

Primary Examiner — Isaac M Woo
(74) Attorney, Agent, or Firm — Womble Bond Dickinson (US) LLP (57) ABSTRACT

Embodiments of this disclosure relate to a method, a device and a computer program product for data protection. The method comprises determining objects selected by a user in a set of objects, and automatically generating one or more corresponding filtering conditions according to the objects selected by the user. The method further comprises automatically setting a predetermined protection policy for objects meeting the filtering conditions in the set of objects. In the embodiments of this disclosure, corresponding filtering conditions are automatically generated according to some protected objects selected by a user to form a dynamic filter, without manually setting the filtering conditions by the user, thereby improving the user experience of a data protection system.

17 Claims, 6 Drawing Sheets

METHOD, DEVICE, AND COMPUTER PROGRAM PRODUCT FOR DATA PROTECTION

CROSS-REFERENCE TO RELATED APPLICATION

This patent application claims priority, under 35 U.S.C. § 119, of Chinese Patent Application No. 202010117350.1, filed Feb. 25, 2020, which is incorporated by reference in its entirety.

TECHNICAL FIELD

Embodiments of this disclosure generally relate to the field of data storage technologies, and in particular, to a method, a device, and a computer program product for data protection.

BACKGROUND

Data protection refers to the protection of data of an organization or individual to prevent data loss due to a failure. Different data protection policies may be set for different types of data, for example, how many backups can be set, whether remote or cloud backup is set, etc. Data can be recovered by backup in the event of a data failure or disaster, thus avoiding unnecessary losses.

With the development of network technologies, data protection systems extend data from a data center to a cloud environment. A user may configure information of cloud storage in a data protection system and then select a disaster-tolerant virtual machine (VM), thus backing up to the cloud regularly. If a production machine of the user is failed and becomes unavailable, a virtual machine may be selected from the data protection system and deployed directly to the cloud until the production machine is recovered.

SUMMARY OF THE INVENTION

A method, a device, and a computer program product for data protection are provided in embodiments of this disclosure.

In an aspect of this disclosure, a method for data protection is provided. The method comprises: determining objects selected by a user in a set of objects; generating one or more filtering conditions according to the objects selected by the user; and setting a predetermined protection policy for objects meeting the one or more filtering conditions in the set of objects.

In another aspect of this disclosure, an electronic device is provided. The device comprises a processing unit and a memory, wherein the memory is coupled to the processing unit and has instructions stored thereon. When the instructions are executed by the processing unit, the following actions are performed: determining objects selected by a user in a set of objects; generating one or more filtering conditions according to the objects selected by the user; and setting a predetermined protection policy for objects meeting the one or more filtering conditions in the set of objects.

In yet another aspect of this disclosure, a computer program product is provided. The computer program product is tangibly stored in a non-transitory computer-readable medium and comprises computer-executable instructions. When executed, the computer-executable instructions cause a computer to perform the method or process according to the embodiments of this disclosure.

The summary is provided to introduce the choice of concepts in a simplified form, which will be further described in the detailed description below. The summary is neither intended to identify key features or major features of this disclosure, nor intended to limit the scope of each embodiment of this disclosure.

BRIEF DESCRIPTION OF THE DRAWINGS

The above and other objectives, features, and advantages of this disclosure will become more apparent based on more detailed description of example embodiments of this disclosure with reference to accompanying drawings, wherein identical reference numerals usually represent identical elements in the example embodiments of this disclosure.

DETAILED DESCRIPTION

Preferred embodiments of this disclosure will be described in more detail below with reference to the accompanying drawings. Some specific embodiments of this disclosure have been shown in the accompanying drawings. However, it should be understood that this disclosure can be implemented in various forms and should not be limited by the embodiments described here. In contrast, the embodiments are provided to make this disclosure more thorough and complete, and the scope of this disclosure can be fully conveyed to those skilled in the art.

The term "include/comprise" and its variants used herein indicate open inclusion, i.e., "including/comprising, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise explicitly indicated.

Various protection policies can be set to protect various objects in a data protection system. Conventionally, a user may set a protection policy manually for each object that needs protection, or the user may manually create a filtering condition so that a protection policy is automatically set for an object meeting the filtering condition. After the user manually creates appropriate filtering conditions, similar objects in the future can be automatically added to the corresponding protection policies. However, manually creating filtering conditions requires a lot of manual operations by the user, which takes a lot of time and affects the user experience.

Therefore, a solution of automatically generating a dynamic filter when a protection policy is created is proposed in the embodiments of this disclosure. Different from the conventional manner of setting filtering conditions by a user manually, in the embodiments of this disclosure, corresponding filtering conditions are automatically generated according to some protected objects selected by a user to form a dynamic filter, without manually setting the filtering conditions by the user, thereby improving the user experience of data protection products. According to the embodiments of this disclosure, the user does not need to analyze attributes of objects to create filtering conditions from scratch, which not only simplifies the operation of setting filtering conditions, but also reduces a lot of configuration time for the user.

The inventor of this application noticed that a dynamic filter can be automatically generated based on analysis of protected objects selected by the user, so that subsequent similar objects can be automatically assigned to the same protection policy. Therefore, an intelligent solution of automatically generating a dynamic filter based on objects selected by a user when a protection policy is created is proposed in this disclosure. According to the embodiments of this disclosure, the user only needs to select a part of the objects that he/she wants to protect, which can avoid complex operations during creation of the dynamic filter.

Optionally, in some embodiments of this disclosure, an unsupervised clustering method and a supervised classification algorithm are combined to generate filtering conditions for target protection policies, which improves the accuracy of the generated filtering conditions. In addition, in some embodiments of this disclosure, a decision tree (such as a classification and regression tree (CART)) is also used for fast classification of objects, which speeds up the generation of filtering conditions.

The basic principle and several example implementations of this disclosure are described below with reference to FIG. 1 to FIG. 8. It should be appreciated that the example embodiments are given only to enable those skilled in the art to better understand and then implement the embodiments of this disclosure, but not to limit the scope of this disclosure in any way.

Figure 1:
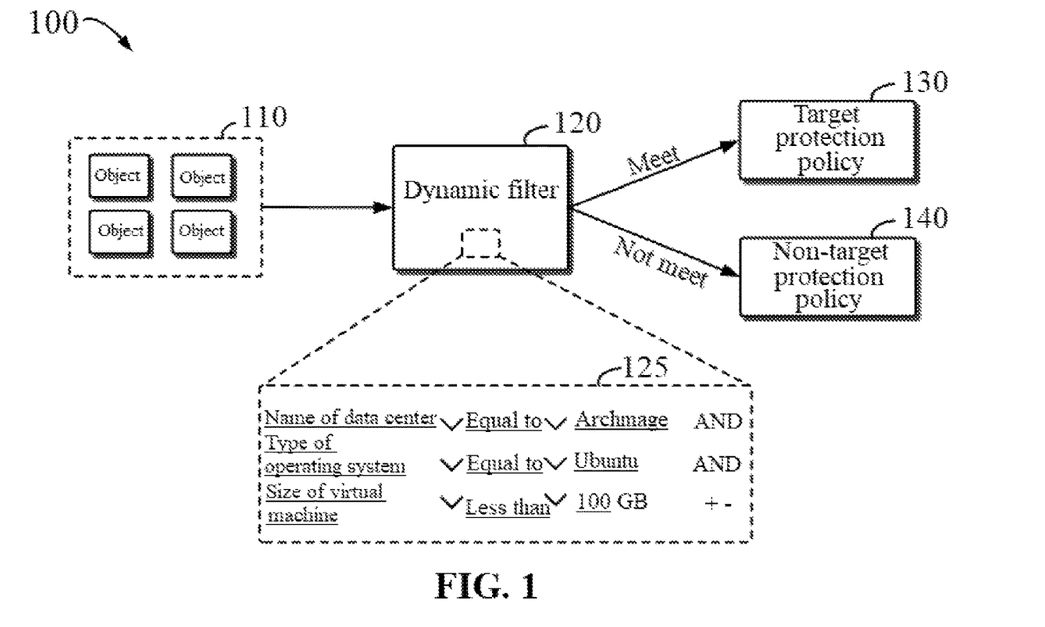
FIG. 1 is a schematic diagram of an operating environment of a dynamic filter according to an embodiment of this disclosure.

FIG. 1 is a schematic diagram of operating environment 100 of a dynamic filter according to an embodiment of this disclosure. As shown in FIG. 1, there are a plurality of objects 110 in a data protection system. The objects may be assets that a user needs to protect, for example, a virtual machine (VM), a structured query language (SQL) database, a file system disk, and so on. Different protection policies may be required for different objects in these objects 110. For example, more data backups may be required for a more important database.

Dynamic filter 120 can filter objects 110 so as to automatically determine whether each object meets a filtering condition of a target protection policy. The "dynamic filter" includes a target protection policy and one or more filtering conditions, and objects meeting this filtering condition or these filtering conditions will be automatically assigned to the target protection policy. In general, separate dynamic filters can be set for respective target protection policies. The dynamic filter may include one or more filtering conditions. As shown in FIG. 1, dynamic filter 120 includes three example filtering conditions 125. The first filtering condition is to define "name of data center," the second filtering condition is to define "type of operating system," and the third filtering condition is to define "size of virtual machine." For each object 110, dynamic filter 120 judges whether it meets each filtering condition, and sets target protection policy 130 for the object if it meets all the filtering conditions; or does not set any target protection policy if it does not meet all the filtering conditions, as shown by 140. For example, three backups may be set in an example of target protection policy 130, one of which is in the cloud.

When a new object is found by a data protection product, dynamic filter 120 can automatically judge whether the new object meets the filtering conditions, and target protection policy 130 will be set for the object meeting the filtering conditions. The dynamic filter may include a plurality of filtering conditions, which may be connected by logical "AND" or "OR." Each filtering condition may be a simple logical statement about an object attribute. For example, the third filtering condition in filtering condition 125 is "size of virtual machine is less than 100 GB," wherein "size of virtual machine" is an object attribute, "less than" is a logical operator, and "100 GB" is a comparison value.

In some embodiments, the object may be a virtual machine, and examples of attributes of a virtual machine object that can be used to build filtering conditions are shown in Table 1 below.

TABLE 1

Attributes of a virtual machine object used to build filtering conditions

| Attributes of a virtual machine | Type | Description |
| --- | --- | --- |
| Name of data center | String | Name of a data center that supports the virtual machine |
| Name of data repository | String | Name of a data repository that provides storage for the virtual machine |
| Type of operating system | String | Type of an operating system of the virtual machine |
| Name of virtual machine | String | Display name of the virtual machine |
| Folder name of virtual machine | String | Folder name of the virtual machine |
| Resource pool of virtual machine | String | Name of a resource pool that provides resources of the virtual machine |
| Size of virtual machine | Integer | Byte size of the virtual machine |
| Label of virtual machine | Array of strings | Label of the virtual machine |

In addition, various logical operators are also included in filtering conditions, and logical operators for building the filtering conditions are shown in Table 2 below.

TABLE 2

Logical operators for building filtering conditions

| Logical operator | Description |
| --- | --- |
| Begin with . . . | For comparing strings |
| End with . . . | For comparing strings |
| Contain | For comparing strings |
| Not contain | For comparing strings |
| Equal to | For comparing strings, arrays of strings, and integers |
| Not equal to | For comparing strings, arrays of strings, and integers |
| Include | For checking whether an array of strings includes a string |

TABLE 2-continued

Logical operators for building filtering conditions

| Logical operator | Description |
|---|---|
| Not include | For checking whether an array of strings does not include a string |
| Less than | For comparing integers |
| Greater than | For comparing integers |

Figure 2:
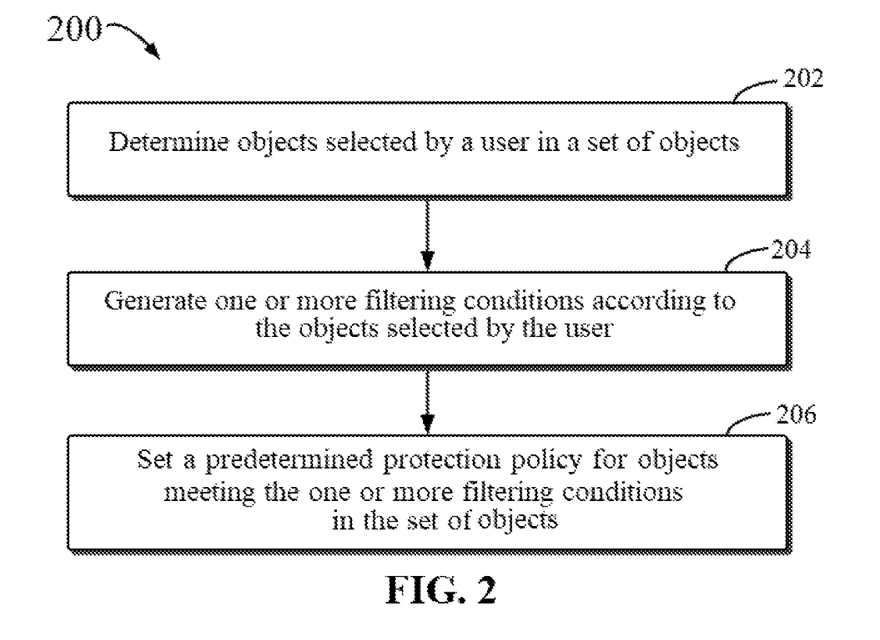
FIG. 2 is a flowchart of a method for data protection according to an embodiment of this disclosure.

FIG. 2 is a flowchart of method 200 for data protection according to an embodiment of this disclosure. As shown in FIG. 2, in 202, objects selected by a user in a set of objects are determined. For example, the user may select objects that he/she wants to protect from a set of objects, and the objects selected by the user are extracted for analysis to create internal filtering conditions. The user may select all or some of the objects that he/she wants to protect, and examples of the objects include, but are not limited to, a virtual machine, an SQL database, a file system disk, and so on.

In 204, one or more filtering conditions are generated according to the objects selected by the user. For example, each condition includes an object attribute, a logical operator, and a comparison value, and the one or more filtering conditions and a predetermined protection policy may form the dynamic filter of this disclosure. Filtering conditions corresponding to the objects are determined by analyzing the objects selected by the user. In some embodiments, objects not selected by the user may be firstly clustered, and then a decision tree is generated by using the result of clustering. In the decision tree, a path from the node corresponding to the objects selected by the user to a root node is a filtering condition. In some embodiments, the automatically generated filtering conditions may not be accurate enough, so the automatically generated filtering conditions may be presented to the user and then micro-adjustment of the filtering conditions by the user may be received. As such, the accuracy of the filtering conditions can be improved.

In 206, a predetermined protection policy is set for objects meeting the one or more filtering conditions in the set of objects. In some embodiments, the objects that the user wants to protect may not be completely selected, so the objects meeting the one or more filtering conditions may include objects not selected by the user, and the user may be reminded whether one or more objects are missed in the selection. Alternatively, a predetermined protection policy may be directly set for all the objects meeting the one or more filtering conditions.

Therefore, according to the embodiment of this disclosure, corresponding filtering conditions are automatically generated according to some protected objects selected by a user to form a dynamic filter, which can eliminate the operation of manually setting filtering conditions by the user, thereby improving the user experience of data protection products.

In some embodiments, after the dynamic filter that includes filtering conditions is generated, it is automatically determined, for a newly found new object, whether the new object meets the filtering conditions. If the new object meets the filtering conditions, a predetermined protection policy is directly set for the new object. If the new object does not meet the filtering conditions, there is no need to set a predetermined protection policy for the new object. As such, automatic protection policy management can be performed not only on the existing objects, but also on the new object.

Figure 3:
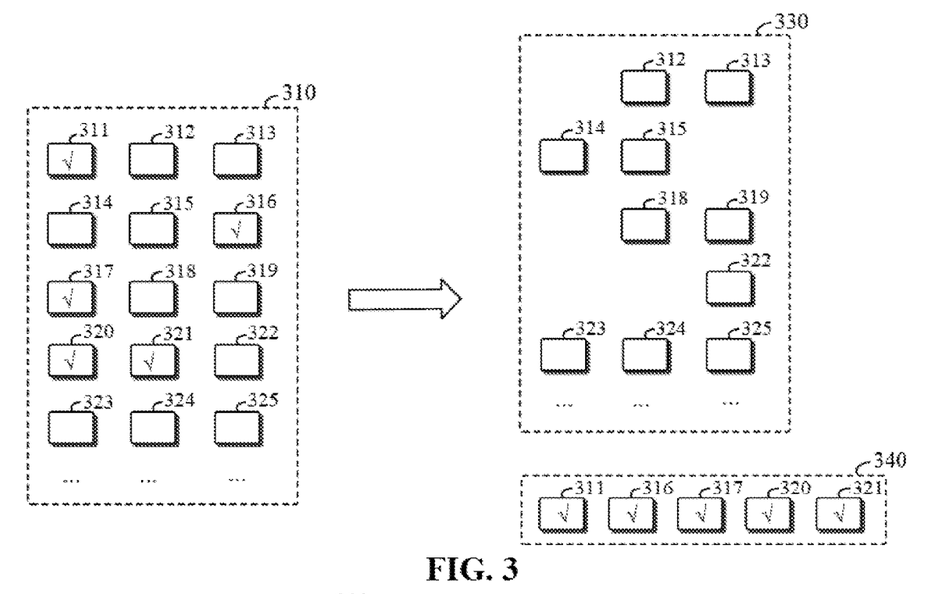
FIG. 3 is a schematic diagram of extracting objects selected by a user according to an embodiment of this disclosure.

FIG. 3 is a schematic diagram of extracting objects selected by a user according to an embodiment of this disclosure. In a data protection system as shown in FIG. 3, there is a set of objects 310, such as virtual machine objects, including objects 311-325 and so on. The user selects objects 311, 316, 317, 320, and 321 from the set of objects 310 as objects to be protected. Correspondingly, the set of objects 310 is divided into two parts, i.e., part 340 selected by the user, including objects 311, 316, 317, 320, and 321; and part 330 not selected by the user, including objects 312, 313, 314, 315, 318, 319, 322, 323, 324, 325, and so on.

According to the embodiment of this disclosure, the user operation of creating a dynamic filter only includes selecting objects to be protected, and the objects are expected to be filtered by the created dynamic filter. As shown in FIG. 3, objects 311, 316, 317, 320, and 321 selected by the user are reserved as a special object group and assigned with a reserved cluster identifier (ID), and do not participate in subsequent clustering operations.

Figure 4:
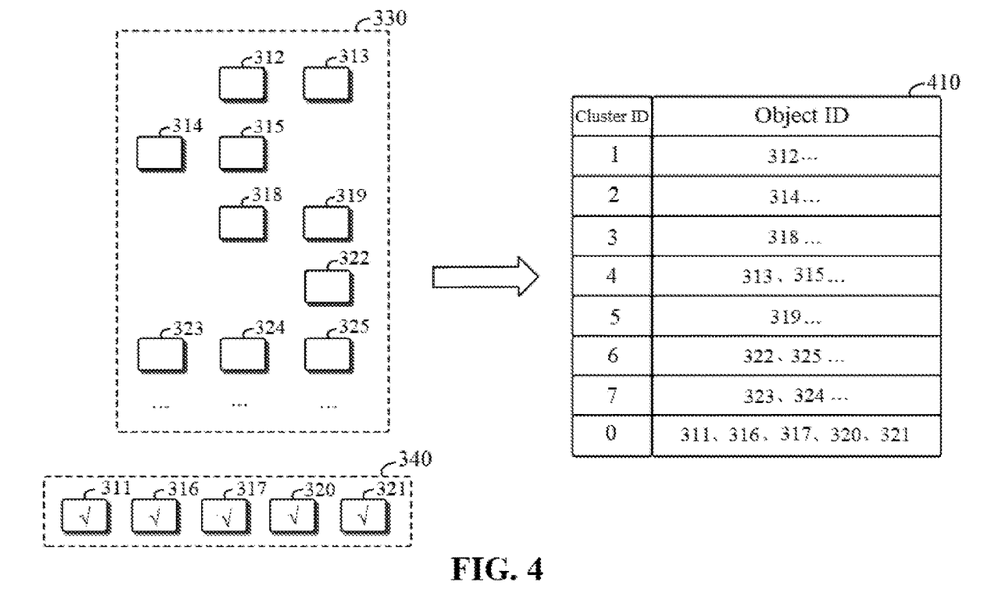
FIG. 4 is a schematic diagram of performing unsupervised clustering on objects not selected by a user according to an embodiment of this disclosure.
Figure 5:
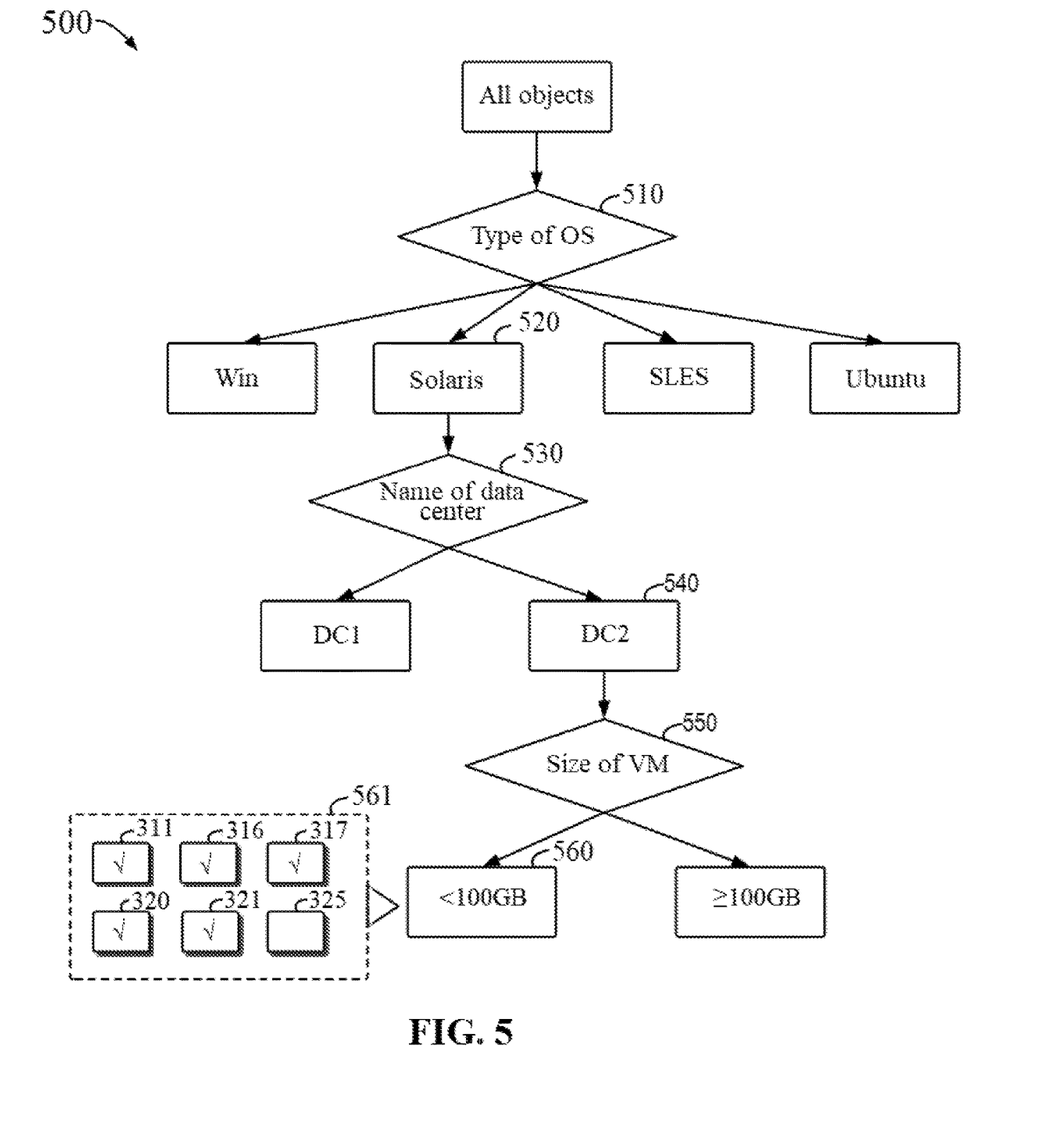
FIG. 5 is a schematic diagram of a decision tree according to an embodiment of this disclosure.
Figure 6:
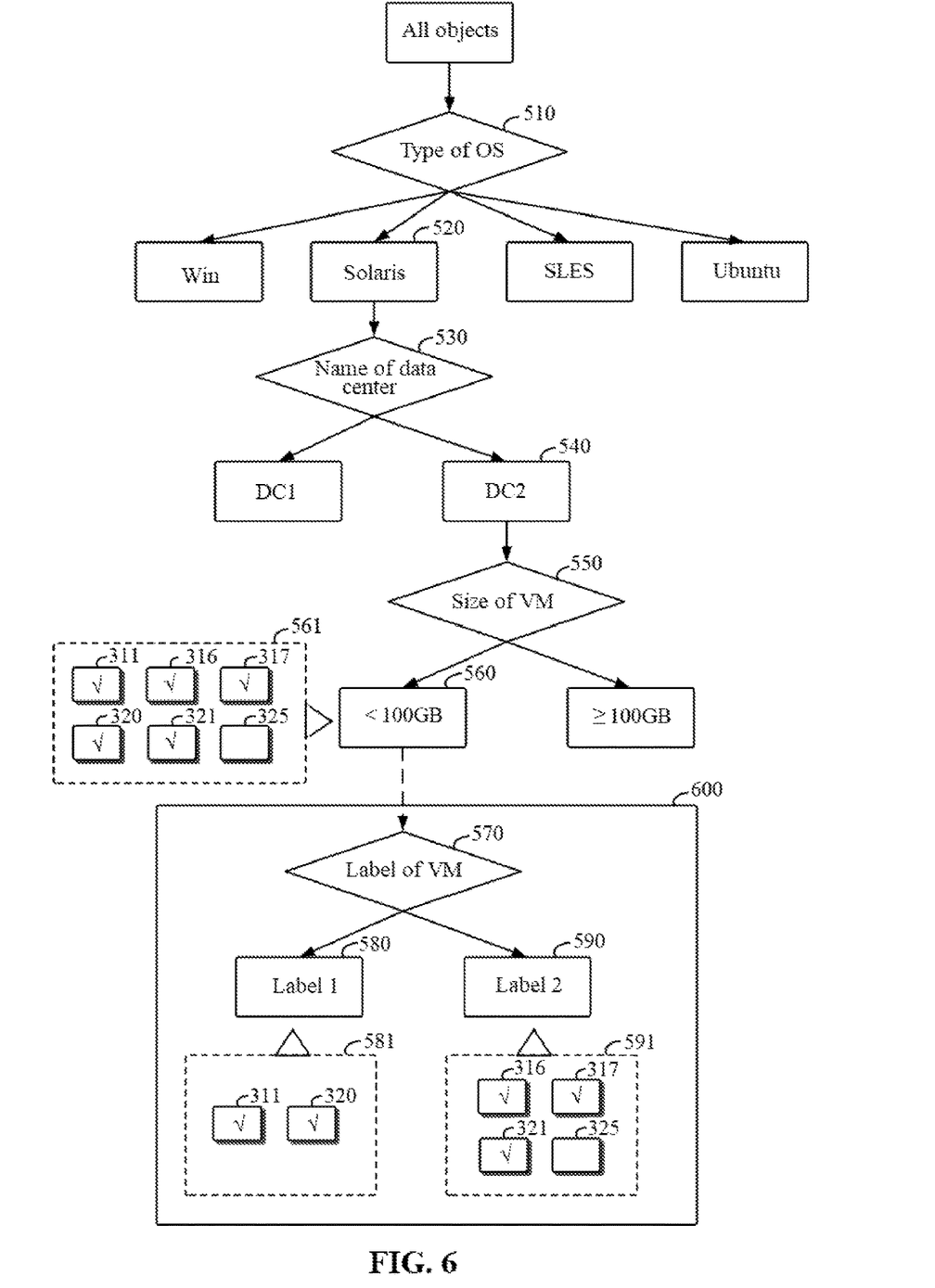
FIG. 6 is a schematic diagram of judging whether a decision tree splitting stop condition is met according to an embodiment of this disclosure.
Figure 7:
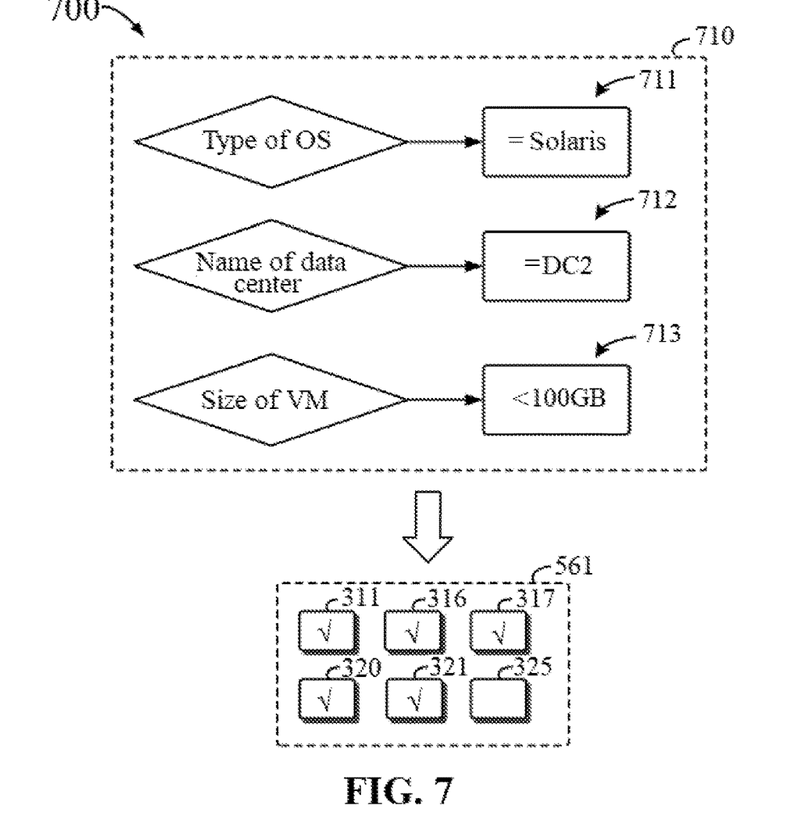
FIG. 7 is a schematic diagram of generating a dynamic filter according to an embodiment of this disclosure.

According to the embodiment of this disclosure, the generation of a decision tree may include two stages. In the first stage, as shown in FIG. 4, all the objects are pre-classified by using an unsupervised machine learning technology. The result of pre-classification is to create a classification result table that includes cluster IDs and corresponding object IDs. In the second stage, as shown in FIG. 5 to FIG. 7, supervised classification is performed by using the result of pre-classification in the first stage, and the supervised classification in the second stage may be classification based on a decision tree. Decisions made at the nodes in the decision tree will constitute a dynamic filter.

First of all, the procedure proceeds to the first stage. FIG. 4 is a schematic diagram of performing unsupervised clustering on objects not selected by a user according to an embodiment of this disclosure. As shown in FIG. 4, unsupervised clustering is performed on remaining part 330 not selected by the user, including objects 312, 313, 314, 315, 318, 319, 322, 323, 324, 325, and so on, thereby clustering them into seven classes. A cluster of cluster ID value 1 includes object 312 and so on, a cluster of cluster ID value 2 includes object 314 and so on, a cluster of cluster ID value 3 includes object 318 and so on, a cluster of cluster ID value 4 includes objects 313, 315, and so on, a cluster of cluster ID value 5 includes object 319 and so on, a cluster of cluster ID value 6 includes objects 322, 325, and so on, and a cluster of cluster ID value 7 includes objects 323, 324, and so on. Objects 311, 316, 317, 320, and 321 selected by the user are assigned with a reserved cluster ID value 0. As shown in FIG. 4, all objects may be classified into eight classes after clustering, thus forming data set 410 for generating a decision tree.

In some embodiments, the objects not selected by the user may be classified into K groups by using a K-means algorithm without presetting the number of groups, where K represents the number of user groups after clustering. K-means is an unsupervised clustering algorithm featured with simpleness and high computational speed. By using the K-means algorithm, the objects not selected by the user can be classified into several clusters according to attributes of the objects.

Next, the procedure proceeds to the second stage. FIG. 5 is a schematic diagram of decision tree 500 according to an embodiment of this disclosure. Decision tree is an important algorithm type for predicting modeling machine learning. It has a flowchart-like structure, in which each internal node represents a "test" on an attribute, each branch represents the result of a test, and each leaf node represents a class label (a decision made after calculation of all attributes). A path from a root node to a leaf node represents a classification rule. In decision analysis, decision tree and closely related influence graphs are used as tools supporting visual and analytical decision-making. Decision tree is often used in decision analysis to help determine the most likely target, and is also a policy for popular tools in machine learning. Decision tree is a widely used non-parametric efficient machine learning modeling technology for regression and classification problems. To find a solution, the decision tree makes sequential and hierarchical decisions on outcome variables according to predictor data. A regression or classification model is built in the form of a tree structure by the decision tree. The data set is decomposed into increasingly smaller subsets by the decision tree, and meanwhile, the associated decision tree is gradually developed to finally form a tree with decision nodes and leaf nodes.

A classification and regression tree (CART) is a decision tree algorithm, which is a widely used decision tree learning method consisting of feature selection, tree generation, and pruning, and can be used for both classification and regression. The CART algorithm mainly consists of the following two steps: decision tree generation: generating a decision tree based on a training data set, wherein the generated decision tree should be as large as possible; and decision tree pruning: pruning the generated tree by using a verification data set and selecting an optimal sub-tree. In this case, the loss function being minimum is used as a standard of pruning.

As illustrated by data set 410 shown in FIG. 4, each object has been assigned with a cluster ID in the unsupervised clustering of the first stage. Data set 410 will be used for a classification model based on a supervised decision tree. Decision tree 500 attempts to classify the objects into a plurality of hierarchical subsets according to cluster IDs by judging some conditions. Attributes of the objects will be used for condition judgment. In the CART algorithm, the most important attribute will be selected first to classify the objects by calculating Gini values, so that the CART becomes a fast and efficient method to classify all objects into a plurality of pre-allocated clusters.

Referring back to FIG. 5, corresponding decision tree 500 is automatically generated through the CART algorithm according to data set 410 obtained in the first stage. In the process of generating decision tree 500, cluster IDs of the objects will be taken into account during calculation of a Gini coefficient in the CART algorithm, thus generating the shortest and most efficient path. In decision tree 500, a path corresponding to a cluster of the objects selected by the user is as follows: first, the type of an operating system (OS) is judged at node 510; if the type of the OS is Solaris 520, the name of a data center is judged at node 530; if the name of the data center is DC2 540, the size of a virtual machine (VM) is judged at node 550; and if the size of the VM is less than 100 GB, leaf node 560 corresponding to the cluster of the objects selected by the user is reached. As shown in FIG. 5, in addition to including objects 311, 316, 317, 320, and 321 selected by the user, object set 561 at leaf node 560 also includes object 325 that is not selected by the user, and the user may be reminded whether object 325 is missed in the selection. As such, objects that the user intends to protect can be obtained more completely according to the embodiment of this disclosure.

FIG. 6 is a schematic diagram of judging whether a decision tree splitting stop condition is met according to an embodiment of this disclosure. At an upper level of the decision tree, each node may correspond to a plurality of objects with different cluster IDs, so it may be difficult to classify all objects into correct groups with only a few judgment conditions. With the constant splitting of the decision tree, the objects corresponding to each leaf node will include fewer unique cluster IDs, or even some leaf nodes will include only objects with the same cluster ID. The objects selected by the user are classified together with other objects at the upper level of the decision tree. With the splitting of the decision tree, the size of the nodes will be decreased, and increasingly more objects from other clusters will be classified into other nodes. If the operation of splitting the decision tree causes the objects selected by the user to be classified into a plurality of subgroups, the standard of stopping splitting the whole tree is met. The stop condition is that if the decision tree is split again, the objects selected by the user will be assigned to different leaf nodes in the decision tree. That is, if the splitting of the decision tree causes the objects selected by the user to be assigned to different leaf nodes, the splitting of the decision tree is stopped.

As denoted by 600 in FIG. 6, object set 561 at leaf node 560 mainly includes objects 311, 316, 317, 320, and 321 selected by the user, and includes only one object 325 from another cluster. On the assumption that leaf node 560 in the decision tree is split again, then the CART algorithm at node 570 will attempt to split the node into two leaf nodes 580 and 590 according to VM labels, wherein leaf node 580 covers object set 581 including objects 311 and 320, and leaf node 590 covers object set 591 including objects 316, 317, 321, and 325. As can be seen, the objects selected by the user will be classified into two leaf nodes, so the decision tree splitting stop condition is met. Therefore, the splitting in block 600 will be discarded, and the extension of decision tree 500 will be stopped, thus completing the generation of the decision tree.

FIG. 7 is a schematic diagram 700 of generating a dynamic filter according to an embodiment of this disclosure. As shown in FIG. 7, after decision tree 500 is generated, each filtering condition in the dynamic filter may be generated based on a path from leaf node 560 corresponding to the objects selected by the user to root node 510. For example, the judgment condition corresponding to leaf node 560 includes: judgment condition 711 in which whether the type of an OS is Solaris is judged; judgment condition 712 in which whether the name of a data center is DC2 is judged; and judgment condition 713 in which whether the size of a VM is less than 100 GB is judged. Dynamic filter 710 may be further generated based on the judgment conditions. Then, object set 561 may be automatically filtered out by applying the generated dynamic filter 710 to all objects 310, thus meeting the intention of the user.

Final objects filtered by the dynamic filter may be exactly the same as the objects selected by the user, but may also include more objects. In this case, a prompt may be displayed on a user interface to remind the user to check whether an object or some objects are missed in the initial selection stage. There may be too many objects for the user to select. In this case, the user may select only some of the objects, and the dynamic filter can automatically help the user identify other similar objects. Therefore, the embodiment of this disclosure can also help the user find similar objects.

Figure 8:
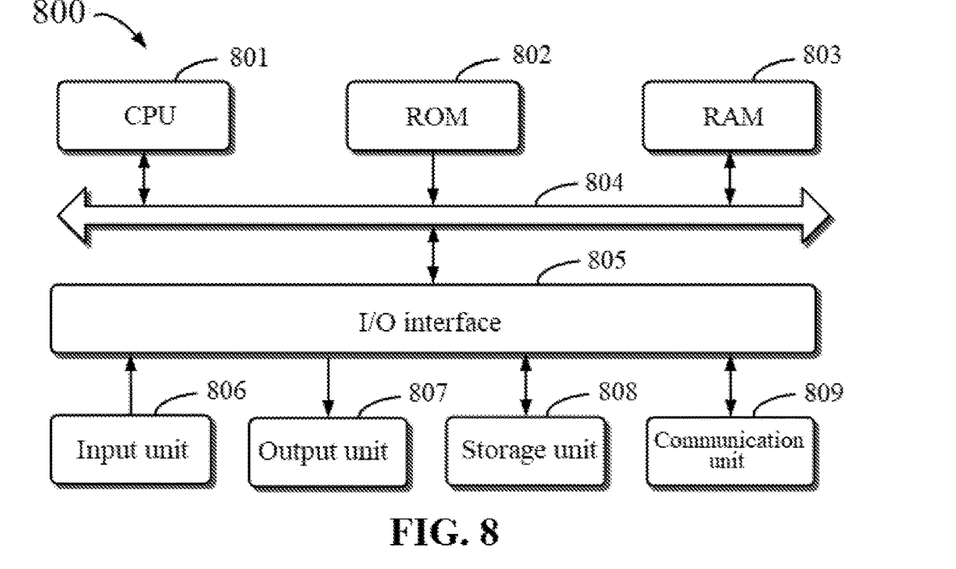
FIG. 8 is a schematic block diagram of a device that can be used to implement an embodiment of this disclosure.

FIG. 8 is a schematic block diagram of device 800 that can be configured to implement an embodiment of this disclosure. Device 800 may be a device or apparatus described in the embodiment of this disclosure. As shown in FIG. 8, device 800 includes central processing unit (CPU) 801 that can perform various appropriate actions and processing according to computer program instructions stored in read-only memory (ROM) 802 or computer program instructions loaded from storage unit 808 to random access memory (RAM) 803. Various programs and data required for the operation of device 800 can also be stored in RAM 803. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices over a computer network such as the Internet and/or various telecommunication networks.

The various methods or processes described above may be performed by processing unit 801. For example, in some embodiments, the method can be implemented as a computer software program that is tangibly included in a machine-readable medium, such as storage unit 808. In some embodiments, some or all of the computer program can be loaded and/or installed onto device 800 via ROM 802 and/or communication unit 809. When the computer program is loaded into RAM 803 and executed by CPU 801, one or more of the steps or actions in the methods or processes described above may be implemented.

In some embodiments, the methods and processes described above may be implemented as a computer program product. The computer program product may include a computer-readable storage medium having computer-readable program instructions for performing various aspects of this disclosure loaded thereon.

The computer-readable storage medium can be a tangible device capable of retaining and storing instructions used by an instruction-executing device. For example, the computer-readable storage medium can be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punched card or a protruding structure within a groove on which instructions are stored, and any appropriate combination of the above. The computer-readable storage medium as used herein is not explained as instant signals per se, such as radio waves or other electromagnetic waves propagated freely, electromagnetic waves propagated through waveguides or other transmission media (e.g., light pulses propagated through fiber-optic cables), or electrical signals transmitted over wires.

The computer-readable program instructions described herein may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of this disclosure may be assembly instructions, instruction set architecture (ISA) instructions, machine instructions, machine-related instructions, microcode, firmware instructions, state setting data, or source code or object code written in any combination of one or more programming languages, including object-oriented programming languages as well as conventional procedural programming languages. The computer readable program instructions can be completely executed on a user's computer, partially executed on a user's computer, executed as a separate software package, partially executed on a user's computer and partially executed on a remote computer, or completely executed on a remote computer or a server. In the case where a remote computer is involved, the remote computer can be connected to a user's computer over any kind of networks, including a local area network (LAN) or a wide area network (WAN), or can be connected to an external computer (e.g., connected over the Internet provided by an Internet service provider). In some embodiments, an electronic circuit, such as a programmable logic circuit, a field programmable gate array (FPGA), or a programmable logic array (PLA), can be customized by utilizing state information of the computer-readable program instructions. The electronic circuit can execute the computer-readable program instructions to implement various aspects of this disclosure.

These computer-readable program instructions can be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. These computer-readable program instructions may also be stored in a computer-readable storage medium, and these instructions cause a computer, a programmable data processing apparatus and/or another device to work in a specific manner, such that the computer-readable medium storing the instructions includes an article of manufacture that includes instructions for implementing various aspects of the functions/actions specified in one or more blocks in the flowcharts and/or block diagrams.

The computer-readable program instructions may also be loaded onto a computer, another programmable data processing apparatus, or another device such that a series of operational steps are performed on the computer, another programmable data processing apparatus, or another device to produce a computer-implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate the architecture, functions, and operations of possible implementations of devices, methods, and computer program products according to multiple embodiments of this disclosure. In this regard, each block in the flowcharts or block diagrams can represent a module, a program segment, or a portion of an instruction that includes one or more executable instructions for implementing specified logical functions. In some alternative implementations, functions labeled in the blocks may occur in an order different from that labeled in the accompanying drawing. For example, two successive blocks may actually be performed basically in parallel, or they may be performed in an opposite order sometimes, depending on the functions involved. It should also be noted that each block in the block diagrams and/or flowcharts, and a combination of blocks in the block diagrams and/or flowcharts can be implemented using a dedicated hardware-based system for executing specified functions or actions, or can be implemented using a combination of dedicated hardware and computer instructions.

Various embodiments of this disclosure have been described above, and the foregoing description is illustrative rather than exhaustive, and is not limited to the disclosed embodiments. Numerous modifications and changes are apparent to those of ordinary skill in the art without departing from the scope and spirit of the various illustrated embodiments. The selection of terms as used herein is intended to best explain the principles and practical applications of the various embodiments, or the technical improvements to the technologies on the market, or to enable other persons of ordinary skill in the art to understand the embodiments disclosed here.

The invention claimed is:

1. A computer-implemented method for data protection, comprising:
   determining, by a processing unit, objects to be protected by a protection policy that are selected by a user in a set of objects;
   generating, by the processing unit, one or more filtering conditions based on an analysis of the objects selected by the user; and
   setting the protection policy for objects not selected by the user meeting the one or more filtering conditions in the set of objects,
   wherein generating the one or more filtering conditions comprises:
      determining the objects not selected by the user in the set of objects;
      performing unsupervised clustering on the objects not selected by the user to obtain a plurality of classes and objects corresponding to each of the classes; and
      generating a data set for creating a decision tree based on the plurality of classes of the objects not selected by the user and a reserved class of the objects selected by the user.

2. The method of claim 1, further comprising:
   obtaining a new object;
   determining whether the new object meets the one or more filtering conditions; and
   setting the protection policy for the new object responsive to determining that the new object meets the one or more filtering conditions.

3. The method of claim 1, wherein generating the one or more filtering conditions further comprises:
   generating a decision tree by supervised classification based on the data set; and
   generating the one or more filtering conditions based on a path from a leaf node corresponding to the reserved class to a root node in the decision tree.

4. The method of claim 3, wherein generating the decision tree by supervised classification comprises:
   generating the decision tree by using a classification and regression tree (CART) algorithm; and
   splitting the decision tree based on the data set until a stop condition is met, the stop condition being that if the decision tree is split again, the objects selected by the user will be assigned to different leaf nodes in the decision tree.

5. The method of claim 1, wherein setting the protection policy comprises:
   determining the objects not selected by the user meeting the one or more filtering conditions in the set of objects; and
   reminding the user, based on a comparison between the objects not selected by the user meeting the one or more filtering conditions and the objects selected by the user, whether one or more objects are missed in the selection.

6. The method of claim 1, wherein generating the one or more filtering conditions comprises:
   presenting the generated one or more filtering conditions to the user; and
   receiving adjustment of the one or more filtering conditions by the user.

7. The method of claim 1, wherein each of the one or more filtering conditions comprises an object attribute, a logical operator, and a comparison value, and a dynamic filter is formed for the one or more filtering conditions of the protection policy and the protection policy.

8. An electronic device, comprising:
   a processing unit; and
   a memory coupled to the processing unit and having instructions stored thereon, wherein when the instructions are executed by the processing unit, the following actions are performed:
   determining objects to be protected by a protection policy that are selected by a user in a set of objects;
   generating one or more filtering conditions based on an analysis of the objects selected by the user; and
   setting the protection policy for objects not selected by the user meeting the one or more filtering conditions in the set of objects,
   wherein generating the one or more filtering conditions comprises:
      determining the objects not selected by the user in the set of objects;
      performing unsupervised clustering on the objects not selected by the user to obtain a plurality of classes and objects corresponding to each of the classes; and
      generating a data set for creating a decision tree based on the plurality of classes of the objects not selected by the user and a reserved class of the objects selected by the user.

9. The device of claim 8, wherein the actions further comprise:
   obtaining a new object;
   determining whether the new object meets the one or more filtering conditions; and
   setting the protection policy for the new object responsive to determining that the new object meets the one or more filtering conditions.

10. The device of claim 8, wherein generating the one or more filtering conditions further comprises:
    generating a decision tree by supervised classification based on the data set; and
    generating the one or more filtering conditions based on a path from a leaf node corresponding to the reserved class to a root node in the decision tree.

11. The device of claim 10, wherein generating the decision tree by supervised classification comprises:
   generating the decision tree by using a classification and regression tree (CART) algorithm; and
   splitting the decision tree based on the data set until a stop condition is met, the stop condition being that if the decision tree is split again, the objects selected by the user will be assigned to different leaf nodes in the decision tree.

12. The device of claim 8, wherein setting the protection policy comprises:
   determining the objects not selected by the user meeting the one or more filtering conditions in the set of objects; and
   reminding the user, based on a comparison between the objects not selected by the user meeting the one or more filtering conditions and the objects selected by the user, whether one or more objects are missed in the selection.

13. The device of claim 8, wherein generating the one or more filtering conditions comprises:
   presenting the generated one or more filtering conditions to the user; and
   receiving adjustment of the one or more filtering conditions by the user.

14. The device of claim 8, wherein each of the one or more filtering conditions comprises an object attribute, a logical operator, and a comparison value, and a dynamic filter is formed for the one or more filtering conditions of the protection policy and the protection policy.

15. A computer program product tangibly stored in a non-transitory computer-readable medium and comprising computer-executable instructions, wherein when executed, the computer-executable instructions cause a computer to perform operations, the operations comprising:
   determining objects to be protected by a protection policy that are selected by a user in a set of objects;
   generating one or more filtering conditions based on an analysis of the objects selected by the user; and
   setting the protection policy for objects not selected by the user meeting the one or more filtering conditions in the set of objects,
   wherein generating the one or more filtering conditions comprises:
      determining the objects not selected by the user in the set of objects;
      performing unsupervised clustering on the objects not selected by the user to obtain a plurality of classes and objects corresponding to each of the classes; and
      generating a data set for creating a decision tree based on the plurality of classes of the objects not selected by the user and a reserved class of the objects selected by the user.

16. The computer program product of claim 15, wherein the operations further comprise:
   obtaining a new object;
   determining whether the new object meets the one or more filtering conditions; and
   setting the protection policy for the new object responsive to determining that the new object meets the one or more filtering conditions.

17. The computer program product of claim 15, wherein generating the one or more filtering conditions further comprises:
   generating a decision tree by supervised classification based on the data set; and
   generating the one or more filtering conditions based on a path from a leaf node corresponding to the reserved class to a root node in the decision tree.

* * * * *